United States Patent [19]

Peterson et al.

[11] 4,295,174
[45] Oct. 13, 1981

[54] MULTI-SERIES GROUP CAPACITOR BANK PROTECTION EQUIPMENT

[75] Inventors: Charles A. Peterson, Van Buren; Louis C. Grove, Jr., Bloomington, both of Ind.

[73] Assignee: Westinghouse Electric Corp., Pittsburgh, Pa.

[21] Appl. No.: 43,531

[22] Filed: May 29, 1979

[51] Int. Cl.³ .............................................. H02H 7/16
[52] U.S. Cl. ........................................ 361/16; 361/17
[58] Field of Search ...................... 361/16, 15, 17, 56, 361/33, 91, 110, 111

[56] References Cited

U.S. PATENT DOCUMENTS

| | | | |
|---|---|---|---|
| 2,363,898 | 11/1944 | Partington | 361/16 |
| 2,878,428 | 3/1959 | Bockman et al. | |
| 3,087,093 | 4/1963 | Bourgerie | |
| 3,259,792 | 7/1966 | Jensen | |
| 3,401,305 | 9/1968 | Lemens | 361/17 |
| 3,471,748 | 10/1969 | Shiomi | 361/16 |
| 3,485,979 | 12/1969 | Mercier | |
| 3,654,511 | 4/1972 | Iwaya | |
| 3,743,884 | 7/1973 | Wafer et al. | |
| 3,805,114 | 4/1974 | Matsuoka et al. | |
| 3,842,374 | 10/1974 | Schlicke | |
| 3,845,358 | 10/1974 | Anderson et al. | |
| 4,002,947 | 1/1977 | Holtzman | |
| 4,028,592 | 6/1977 | Fahlen et al. | 361/16 |
| 4,174,529 | 11/1979 | Hamann | 361/16 |

OTHER PUBLICATIONS

I.E.E.E. Transactions–Power Apparatus and Systems, Jul.-Aug. 1978, vol. PAS-97, pp. 1042-1052, "*A New Series Capacitor Protection Scheme Using Nonlinear Resistors,*" Courts et al.

Primary Examiner—Patrick R. Salce
Attorney, Agent, or Firm—G. H. Telfer

[57] ABSTRACT

A multi-series group capacitor bank has voltage limiters, of the metal oxide type, connected across each individual series group and set at a protection level higher than that of the bank bypass spark gap so the voltage limiters bypass a series group when capacitor fuse clearing causes high voltage build-up in that series group.

7 Claims, 5 Drawing Figures

MULTI-SERIES GROUP CAPACITOR BANK PROTECTION EQUIPMENT

BACKGROUND AND SUMMARY OF THE INVENTION

This invention relates to capacitor bank protection equipment such as series capacitor installations in high voltage alternating current transmission lines.

It is the practice in applications of capacitors, such as for power factor correction in transmission lines as well as other applications, for capacitors to be arranged in multi-series groups. That is, the bank comprises as many individual capacitor units in parallel with each other as is necessary to satisfy requirements for current carrying capacity and as many groups of capacitor units connected in series as is necessary to achieve the required amount of ohms or reactive capacitive impedance. Protective by-pass equipment is usually provided so that the capacitors can be protected against transient conditions that may stress them beyond their inherent design capability. A principal form of protection equipment is one that has across each group of parallel connected capacitor units a spark gap set at a protection level sufficient to ensure the capacitors are not susceptible to failure due to transient line conditions. However, in high voltage equipment, such spark gaps and their associated inductive reactors are expensive items that have a substantial impact on the total cost of the capacitor installation. The cost is further aggravated by the fact that the spark gaps generally available for use in such high voltage installations are not inherently selfextinguishing. That is, it is necessary to provide some means, such as air-blast equipment, for extinguishing the arc after a transient occurs that causes gap firing.

In the art of surge arresters generally, in addition to spark gaps, there are various known solid state suppressor devices used either by themselves or in combination with spark gaps to provide a desired function. Some of these, such as silicon carbide devices, are also not inherently self-extinguishing and current conduction through them will persist after the termination of a transient that initiates the conduction. Others, such as semiconductor zener diodes, employed in a back-to-back configuration, can achieve a high degree of reliable operation without ancillary equipment to terminate conduction after firing but are generally limited as a practical matter to relatively low voltage applications. Other known devices include metal oxide voltage limiters, such as those comprised principally of zinc oxide, which are non-linear resistors, as are silicon carbide devices, but which have a more non-linear characteristic and the ability to terminate conduction upon reduction of voltage level. Such devices are of interest for applications in capacitor protective equipment but in many such potential applications the commercially available devices today are not readily capable of sustaining the degree of energy absorption required and the duty cycle that the devices might be subject to.

Generally, what the present invention achieves is a protection apparatus for capacitor banks in a multiseries group arrangement in which available components are used in a novel combination to achieve both a high degree of reliable protection with minimized costs in terms of the number and nature and quality of required elements.

To set the more particular context in which the present invention arises, it is the case that in multiseries group capacitor banks, each unit has a fuse electrically in series and in close proximity to it. Sometimes such fuses are in fact contained within the capacitor unit itself; otherwise, they are normally on the immediate exterior of the capacitor unit. Current limiting fuses are one type of fuse that has an inherent capability of prevention of build-up of current during its clearing operation. Other fuses that are not current limiting have no such capability and there may be a sharp rise in current before the fuse clears in a brief time after the initiation of the condition causing its operation. Current limiting fuses are therefore preferable in most applications although more costly. The present invention is particularly advantageous in applications of fused capacitor units of any type although the problem addressed is more severe with non-current limiting fuses.

The fuse is intended to remove from service a capacitor unit that is simply not performing at its design level. Out of a bank of dozens of units, there is, of course, a statistical probability that, over time, some small percentage of units will fail and the overall operation of the bank, which is designed with some margin, can be maintained if a defective unit is simply open-circuited by the fuse. One of the major problems in multi-series group capacitor banks is the limitation imposed on designs because of a voltage doubling effect that occurs when a capacitor unit fails and its fuse clears near the first current zero. The other capacitors in the same series group as the failed unit can within a brief time, approximately half a cycle, after the fuse clears, sustain a large trapped voltage. This high voltage on those units imposes high energy absorption and clearing voltage requirements on the fuse. Efforts to avoid this problem tend to go in the direction of higher cost for fuses and capacitor units. In addition, as described above, in series capacitor applications, this doubling effect requires that there be provided one set of over-voltage protection equipment, such as a spark gap and a reactor, for each series group of capacitors.

What the present invention does, in brief, is to permit use of a capacitor bank of multi-series groups in which the capacitor units and their associated fuses may be of conventional design, and furthermore, do not require an individual set of major bypass equipment for each series group of capacitors. These purposes are achieved by an arrangement that includes a voltage limiter, or surge suppressor, assembly on each series group where the voltage limiter is characterized by being self-extinguishing, i.e., not a conventional spark gap or silicon carbide device. Of available components, the most suitable for high voltage equipment to which the present invention is directed are metal oxide voltage limiters such as those principally comprising zinc oxide. However, it is also significant to the practice of this invention that, in contrast to other proposed applications of metal oxide voltage limiters in capacitor protection equipment, the invention comprises a combination in which these voltage limiters are set at a protection level that is greater than that of the bypass equipment across the bank or any involved portion of it. For example, using terminology used in the trade, the capacitor units themselves may have a design capability of sustaining transients below 3.0 per unit (P.U.). That is, no protection or bypass equipment is required to operate so long as the voltage to which the capacitor bank is subjected is less than three times the nominal capacitor voltage. In this case, a set of bypass equipment is provided to operate at the 3.0 P.U. level. This bypass equipment may be a conventional spark gap and reactor configuration in accordance with known practice but which, in contrast with most prior practice, can now be applied across a plurality of series groups of capacitors. The additional voltage limiters provided across each series group in accordance with the invention are set at a higher protective level such as about 3.5 P.U. so their operation does not occur normally upon a line transient which would be taken care of by the protective equipment. These voltage limiters come into play upon the peculiar occurrence of the voltage doubling effect produced during fuse clearing of a failed unit. This may occur, for example, if the fuse of a defective capacitor unit operates when the voltage is at 2.9 P.U. Then there could be a rapid build-up of voltage across adjacent units within the next half cycle up to about 5.8 P.U. But even at this high level, the voltage across the bank seen by the protective equipment may still be below the 3.0 protection level. The individual arrangement of the voltage limiters in accordance with this invention across each series group permits their operation during the fuse clearing voltage doubling effect to briefly bypass just that series group and, because of the self-extinguishing character of such voltage limiters, to permit reinsertion of that series group within a very brief time.

As referred to above, one of the particularly favorable aspects of this invention is the opportunity to reduce the number of major bypass units necessary for the capacitor bank, as it is no longer necessary to provide such bypass equipment across each series group. There is, of course, a further trade-off that one encounters. As the spark gap or other bypass device is provided across larger numbers of series groups, there is need for it to have greater capability resulting in greater size and cost. It is considered that this trade-off will still result in over-all advantages of cost and performance at least to the extent of providing bypass equipment only across each half of a bank or each two series groups, but it is believed that the invention may be applied up to the extreme case in which the bypass equipment is across the entire bank. What is most evident is that the invention affords much greater design flexibility in determining the number and nature of the main power bypass equipment as such equipment no longer has to be designed to take into account the voltage doubling effect on fuse clearing of a failed capacitor unit.

While the present invention is particularly advantageous in applications such as series capacitor banks and transmission lines, it is not so limited. In a typical shunt bank application of capacitors, there are also employed multi-series groups of capacitors, with fuses, that are susceptible to the voltage doubling effect on fuse clearing. Here too, voltage limiters in accordance with the invention may be applied across each series group to take care of the voltage doubling problem. In common with the application in series transmission lines, these units would have a design protection level higher than that which otherwise operates in the system. That is, if there is bypass equipment, an arrestor, connected across the bank, these units would have a design protective level higher than that for operation of that bypass equipment. Even if there is not bypass equipment across the entire bank, these voltage limiters would be set at a protection level that is higher than that of the design capability of the individual capacitor units so that they don't enter into operation or influence anything unless the peculiar instance of the voltage doubling on fuse clearing occurs.

DESCRIPTION OF THE PREFERRED EMBODIMENTS

Figure 1:
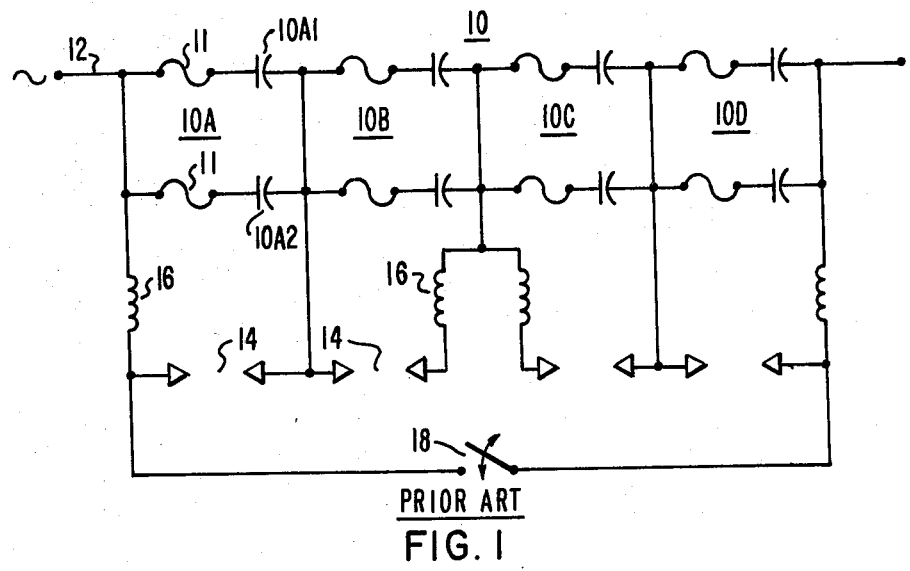
FIG. 1 is a circuit schematic of a prior art embodiment of series capacitor equipment.

FIG. 1 illustrates the general nature of existing series capacitor equipment wherein a capacitor bank 10 comprising a plurality of series groups 10A, 10B, 10C and 10D is in series with a high voltage alternating current transmission line 12. In this Figure, the illustrated apparatus is that for one phase of what would normally be a three-phase system. The numbers of capacitor units can vary both as to the number of series groups (four in this example) and also the number of parallel units (two in this example, such as 10A1 and 10A2; typically the number of parallel units would be at least ten) within a series group, both numbers being a plurality in accordance with known practice. Each capacitor unit, such as 10A1 and 10A2, has a fuse 11 in close series relation to it. By a capacitor "unit" is meant what normally comprises sections of rolled dielectric and foil electrode materials within an enclosure (or can) that is filled with a dielectric fluid. The individual sections inside the can are normally connected in a series-parallel arrangement. An internally fused unit will normally have a fuse element associated with each section while an externally fused element normally has a single external fuse. The illustrated representation of, for example, capacitor 10A1 and fuse 11 is intended to portray any of such capacitors, whether internally or externally fused.

To protect the capacitors with assurance has previously been considered to require a protective bypass device, such as a spark gap 14 located across each of the series groups. With each bypass device 14 is an inductive reactor 16 for reactive compensation. A spark gap device may be made of a fairly reliable nature so that its protection level is stable, but generally suffers the drawbacks of being costly as well as requiring additional equipment (not shown) such as air blast equipment for arc extinction after firing. A mechanical bypass device 18 is also illustrated across the entire bank 10 as is conventional.

Figure 2:
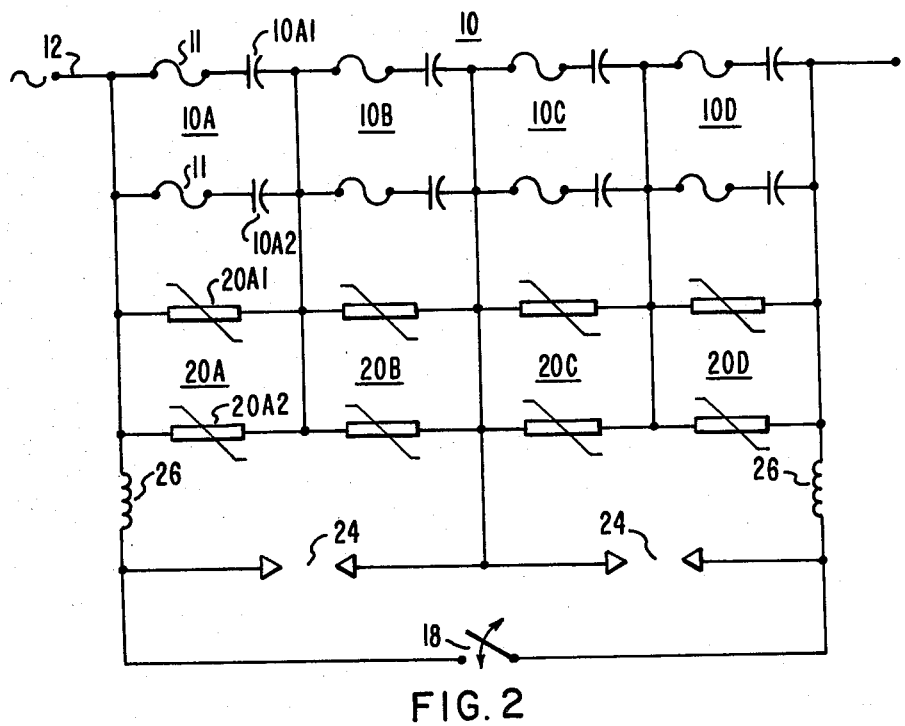
FIG. 2 is a circuit schematic of series capacitor equipment in accordance with one embodiment of the present invention.

In FIG. 2 is shown an embodiment of the present invention that may advantageously replace that of FIG. 1. Here each series group of capacitors 10A, 10B, 10C and 10D has a non-linear resistor or voltage limiter 20A, 20B, 20C or 20D, of particular character to be described, across it. These may be provided in a plurality of parallel elements, such as 20A1 and 20A2 across capacitor group 10A. A bypass or spark gap device 24 is placed across a plurality of series groups (two in this example), with its associated reactor 26, rather than across each series group thereby reducing the number of such protection devices by a factor of two over the arrangement of FIG. 1.

The voltage limiters 20 are, in accordance with this invention, devices that exhibit a sharp non-linear resistance characteristic, i.e., the current-voltage relationship is such that upon a certain voltage being reached, high currents can be conducted without further appreciable increase in voltage. Also, they are to be essentially self-extinguishing after conduction so that upon reduction of the current level, they will revert to the high impedance state. The voltage limiter in accordance with this invention may be selected from known surge suppression devices. However, it is considered that neither spark gap devices or silicon carbide devices as are presently available can well serve the multiple objectives of performance and cost reduction desired in such apparatus. While various semiconductor elements may perform satisfactorily if available with high enough rating, in accordance with this invention what is preferred for the voltage limiters is that each of them be a metal oxide non-linear resistor such as one principally comprising zinc oxide. Examples of suitable metal oxide voltage limiter devices, and their fabrication, are described in Gupta et al. U.S. Pat. No. 4,094,061, June 13, 1978, and Gupta et al. pending application Ser. No. 896,349, filed Apr. 14, 1978 and assigned to Electric Power Research Institute, which descriptions are herein incorporated by reference.

The non-linear resistor elements 20 are not required to be high energy absorbing devices. They are relieved of any heavy duty in this application because they do not replace the major bypass equipment 24. They are only required for the taking care of the fuse clearing problem, so they receive light duty for a short duration. Of significance to the arrangement is that the protection level of the voltage limiters is higher than that of the bypass equipment that spans some plurality of the series groups of capacitors.

Figure 3:
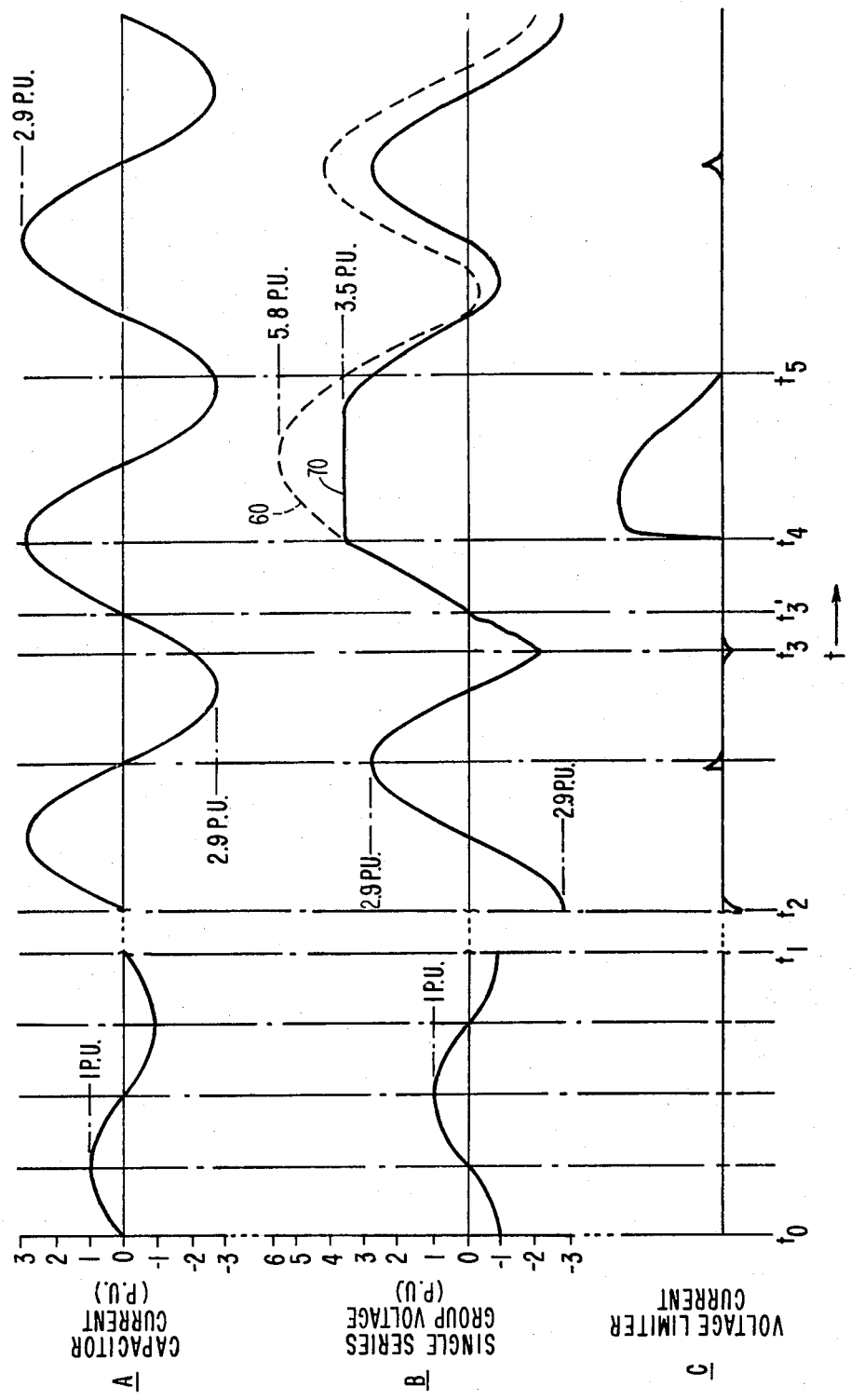
FIG. 3 is a set of waveforms illustrating typical operation and differences in operation of the apparatus depicted in FIGS. 1 and 2.

Referring to FIG. 3, there is shown a representation, with respect to time, of capacitor current through the bank (part A), the voltage across a single series group of capacitors (part B), and the current conducted by the voltage limiters of the single series group. During the period $t_0$ to $t_1$ it is assumed there is no fault on the system: the current and voltage maxima are 1 P.U. and the voltage limiters, such as 20A, conduct no current.

Then due to a system fault, large changes in capacitor current and voltage occur; after time $t_2$ both have maxima of 2.9 P.U. which is within the assumed capability of the capacitor units and is below the chosen protection level of any bypass equipment, from $t_2$ to $t_3$ there is no problem of operation; the system fault is one that both the apparatuses of FIG. 1 and 2 can handle. During this time the voltage limiters of the FIG. 2 embodiment are, or may be, conductive at brief times when the capacitor voltage peaks. This conduction is not a feature required of the protection system but is merely an inconsequential incident of the voltage limiter operation, even though designed for a higher protection level (e.g. 3.5 P.U.) for full conduction than the limiters see at that time.

At time $t_3$, the event occurs that principally differentiates the performance of FIGS. 1 and 2: a capacitor unit such as 10A1 fails at an instant when the capacitor current is near zero. The fuse 11 clears, rapidly causing the voltage across group 10A to go to zero, at $t'_3$. Due to trapped charge the group 10A then sees a voltage excursion that could go up to 5.8 P.U., curve portion 60, twice the previous maximum of 2.9 P.U. In FIG. 1, with bypass 14 set at 3.0 P.U., this would operate to bypass the group. In FIG. 2, however, the bypass 24, spanning a plurality of series groups, still sees only about 2.9 P.U. and does not operate if set at 3.0 P.U. But now the voltage limiters 20A operate at the 3.5 P.U. level to maintain the group voltage at that level, curve portion 70. Between $t_4$ and $t_5$ substantial current is conducted by limiters 20A and then the system stabilizes.

Figure 4:
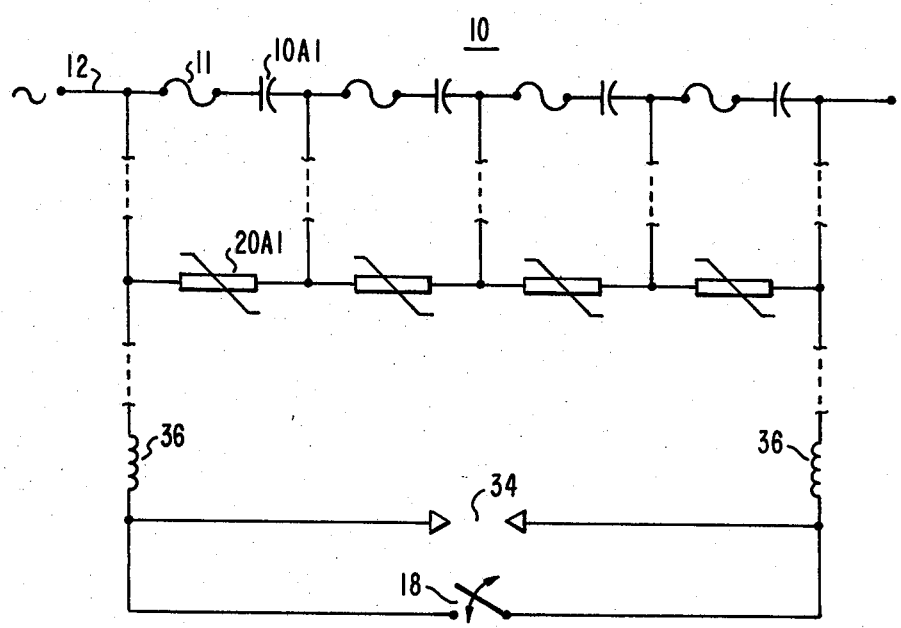
FIG. 4 is a circuit schematic of series capacitor equipment in accordance with another embodiment of the invention.

Referring to FIG. 4, an embodiment of the invention generally similar to that of FIG. 2 is shown but in which the protection bypass equipment, spark gap 34 and associated reactors 36, is disposed across an entire bank 10 of series groups. This shows the ultimate case in which the expense of a larger bypass gap is justified and replaces all of the individual protection equipments otherwise required by the embodiment such as FIG. 1 or the two sets in FIG. 2. The operation of the system of FIG. 4 insofar as the nature and performance of the voltage limiters is concerned is the same as that of FIG. 2.

Figure 5:
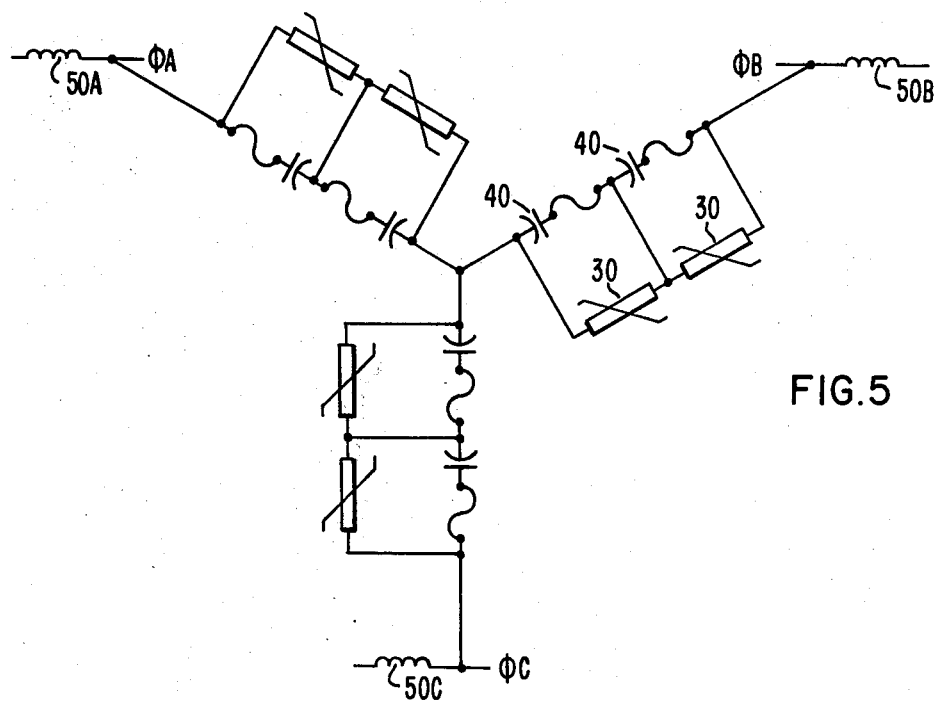
FIG. 5 is a circuit schematic of shunt capacitor equipment in accordance with an embodiment of the present invention.

In FIG. 5 is shown an alternative embodiment of the present invention where voltage limiters as used in FIGS. 2 and 4 are applied to a shunt capacitor application. In shunt power factor compensation the capacitors are arranged in multi-series groups which are also susceptible to the fuse clearing problem described above. Therefore, in accordance with this invention, each series group 40 is associated with voltage limiters 30 that will limit the fuse clearing problem and also will cause firing before any arrester or other protection equipment (not shown) associated with the apparatus is caused to fire. The embodiment of FIG. 5 shows a three phase system including phase conductors, with inherent inductances 50A, 50B and 50C, connected in a Y-configuration.

The arrangements shown are representative of those considered suitable in practicing the invention. The voltage limiters 20A1, etc., may each be a plurality of stacked plates of the metal oxide material chosen in a number and with dimensions sitable for the intended purpose. Additionally, each voltage limiter may have a fuse associated with it.

· We claim:

1. Capacitor apparatus comprising:
   a plurality of capacitor units in a bank arranged in a plurality of series groups with a plurality of units in parallel with each other within each series group;
   a fuse means connected with each capacitor unit;
   bypass means connected across a plurality of said series groups, said bypass means having a predetermined protection level sufficient to protect said capacitor units against transients to which said bank is subjected; and
   voltage limiter means connected individually across each of said series groups and having a predetermined protection level higher than that of said bypass means, said voltage limiter means operable to temporarily bypass a series group upon one of said fuse means of one of said units clearing due to conditions not affecting said bypass means.

2. The subject matter of claim 1 wherein said bank is a series capacitor bank in series with an alternating current transmission line.

3. The subject matter of claim 2 wherein said bypass means is connected across each half of said series groups.

4. The subject matter of claim 2 wherein said bypass means comprises a single spark gap device connected across the entire bank.

5. The subject matter of claim 1 wherein said bank is a shunt capacitor bank connected for power factor correction of an inductance.

6. The subject matter of claim 1 wherein said voltage limiters each comprise a metal oxide voltage limiter.

7. The subject matter of claim 1 wherein said metal oxide voltage limiters are arranged in a plurality of elements across each series group of capacitor units.

* * * * *